Sept. 28, 1971  TATSUO FUKUOKA  3,608,215
FOOTWEAR
Filed Sept. 16, 1969  11 Sheets-Sheet 1

Sept. 28, 1971 TATSUO FUKUOKA 3,608,215
FOOTWEAR
Filed Sept. 16, 1969 11 Sheets-Sheet 5

Sept. 28, 1971 TATSUO FUKUOKA 3,608,215
FOOTWEAR
Filed Sept. 16, 1969 11 Sheets-Sheet 5

Sept. 28, 1971　　　TATSUO FUKUOKA　　　3,608,215
FOOTWEAR

Filed Sept. 16, 1969　　　　　　　　　　11 Sheets-Sheet 10

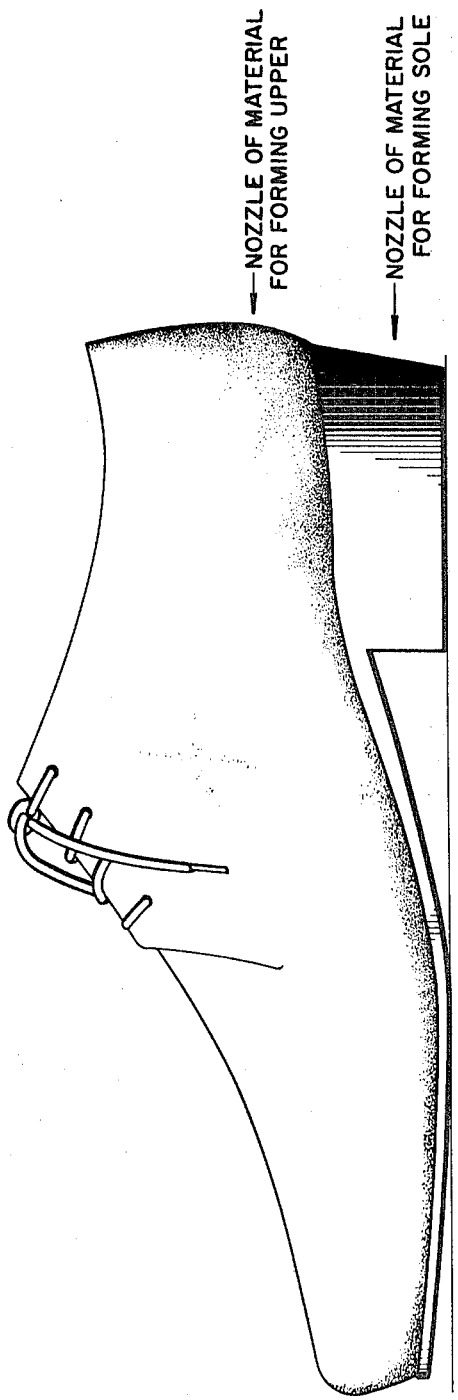

United States Patent Office 3,608,215
Patented Sept. 28, 1971

3,608,215
FOOTWEAR
Tatsuo Fukuoka, 3, 3-Ban, 2-chome, Shin-Minami-Fukushima, Tokushima, Japan
Filed Sept. 16, 1969, Ser. No. 858,389
Claims priority, application Japan, June 14, 1969,
44/56,298, 44/56,299, 44/56,300, 44/56,301,
44/56,302
Int. Cl. A43b 13/20
U.S. Cl. 36—29
8 Claims

ABSTRACT OF THE DISCLOSURE

A hollow main body is provided for use as a wedge type sandal or as a sole or insole of a shoe. The main body is integrally formed of plastic and is provided with a hollow internal chamber surrounded by an upper wall, side walls and a lower wall. The upper wall is preferably thinner than the side walls and lower wall, and the hollow chamber provides a comfortable cushion effect to the wearer. The main body may be formed by blow molding, splash molding, or the like.

BACKGROUND AND SUMMARY

The present invention relates to improvements in footwear and more particularly to improvements in the main bodies, soles, bands, insoles or other articles combined or attached thereto of shoes, sandals or other footwear. The present invention further relates to improvements in footwear such as above-mentioned which are obtained by blow molding.

A principal object of the present invention is to provide a main body, a member or an article of footwear which is provided with an internal hollow chamber and which is strong, light, and economical to manufacture by blow molding or similar means.

Another object of the present invention is to provide a main body or another part thereof which is provided with a hollow space to effect excellent cushion action and to make the footwear light and yet which has a structure enabling the footwear main body to retain sufficent strength and its form.

Another object of the present invention is to provide an article of footwear which is made comfortable to wear by the provision of a structure for causing effective breathing action upon the shift of the walking user's weight.

DESCRIPTION OF THE DRAWING

Other objects and advantages of the present invention will become apparent from the following detailed description of the present invention with reference to the accompanying drawings, in which:

FIG. 6b is a sectional view along line 6b—6b of FIG. 6a;

FIG. 21 is a lateral side view of a shoe according to the present invention.

DESCRIPTION OF SPECIFIC EMBODIMENTS

Figure 1:
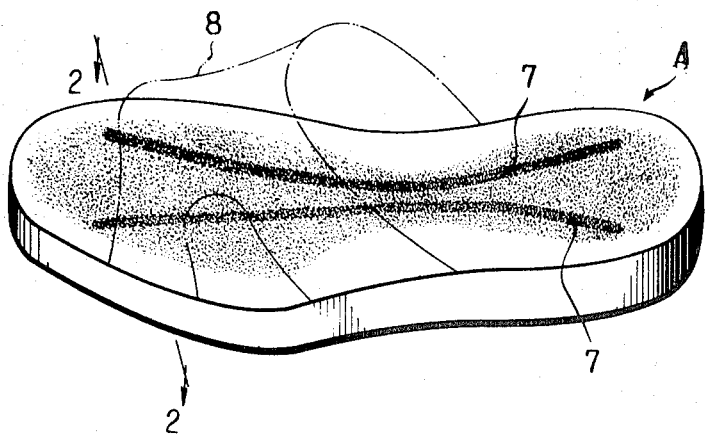
FIG. 1 is a perspective view of a sandal according to the present invention.
Figure 2:
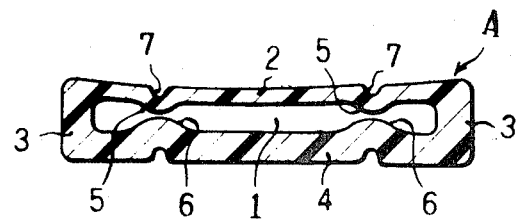
FIG. 2 is a sectional view along line 2—2 of FIG. 1.
Figure 3:
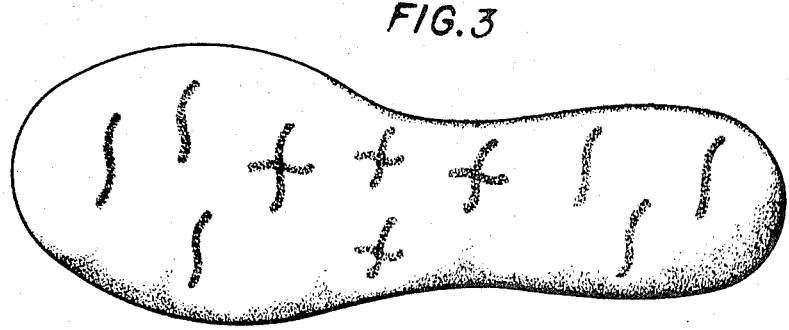
FIG. 3 is a plan view of a modified sandal, the band not being shown.
Figure 4:
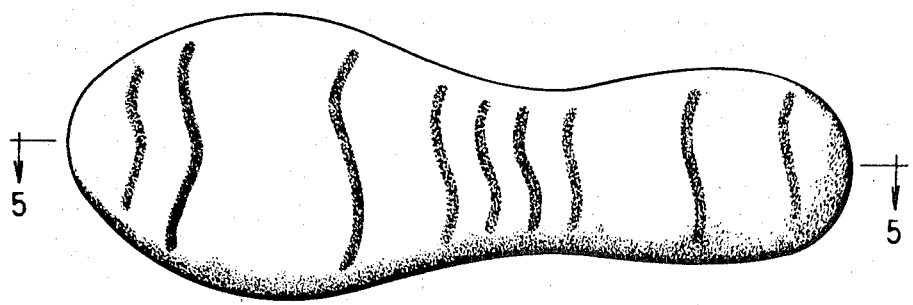
FIG. 4 is a plan view of another modified sandal.
Figure 5:
FIG. 5 is a sectional view along line 5—5 of FIG. 4.

Referring to FIGS. 1 and 2, there is shown a main body of a sandal embodying the present invention. The main body A is integrally molded of a resilient thermoplastic synthetic resin material such as vinyl chloride resin, polyolefin resin or the like by blow molding. As apparent from FIG. 2, the main body A comprises a hollow chamber 1 formed in the interior of the main body, an upper wall 2 perfectly surrounding the hollow chamber, side walls 3 and a lower wall 4, the under face of the lower wall 4 forming a sole substantially in contact with the ground or the floor. Depending upon the purpose, the thickness of the side walls 3 and the lower wall 4 are greater than the thickness of the upper wall 2, the former, for instance, being at least twice as great as the latter so that the main body A is rendered strong enough to withstand the weight of the wearer and to retain its shape over a prolonged period of service life. The upper wall 2, made relatively thin, cooperates with the inner hollow chamber to ensure effective cushion effect. Furthermore, the relationship between the thickness of the lower wall 4 and upper walls 2 is suitably varied depending upon the purposes for which the main body of the sandal or other footwears is used. In the extreme case, for instance, the relationship of the thickness may be reversed. In order to reinforce the main body A, long reinforcing projections 5, 6 project respectively from the upper wall 2 and lower wall 4 toward the hollow chamber 1, the projections being provided in two pairs spaced apart from each other by a suitable distance. However, as shown in FIGS. 3 to 5, the projections 5, 6 in some cases may be cut off into a number of independent projections spaced apart by a suitable distance. These projections may be modified in desired shape. Furthermore, in case where the material of the upper wall 2, side walls 3 and lower wall 4 is extremely tough, none of the projections 5, 6 are formed. Still there is a case where the projections 5, 6 do not project from above and under into the hollow chamber. Either one of the projections 5, 6 alone, for instance, may be provided.

According to FIG. 2, formed on the upper surface of the main body A, namely on the upper surface of the upper wall 2 at the positions corresponding to the projections 5 are two long recessed grooves 7 spaced apart from each other by an appropriate distance and extending in the longitudinal direction of the sandal main body A in curved form. The grooves provide a pattern which makes the appearance of the sandal main body attractive.

Figure 6A:
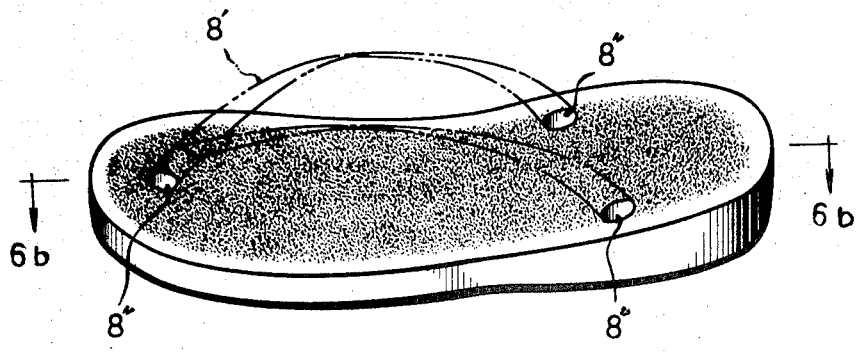
FIG. 6a is a perspective view of a specific styled sandal according to the present invention.
Figure 6:
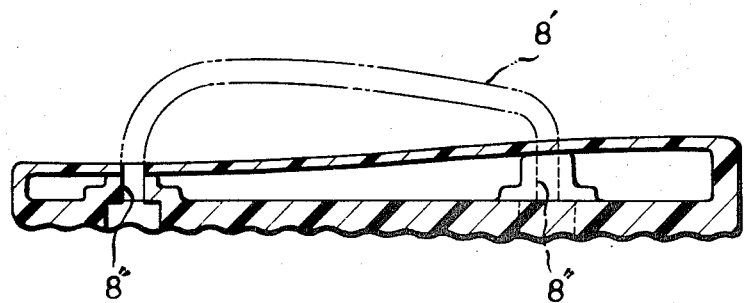

Numeral 8 designates a band member which is made of a thermoplastic synthetic resin material, leather or some other material the same as with the main body and which is inseparably fixed to the upper surface of the main body A in the predetermined position by fusing or with an adhesive. In case where the band portion is a thong 8′ as shown in FIGS. 6a and 6b, holes 8″, 8″, 8″ for attaching the thong are formed in the main body A after blow molding of the body and the thong 8′ is then passed through the holes and fixed to the body.

It will be readily understood that the sandal thus constructed has advantages below. The provision of the hollow chamber within the main body A serves to make the sandle light in weight and gives excellent cushion to the wearer to ensure wearing comfort. The side walls 3 and lower wall 4 which are at least twice as thick as the upper wall 2 as already described and the reinforcing projections make the main body A strong enough to withstand the weight of the wearer and allow the body to retain its shape, thereby ensuring a prolonged service life. The upper wall which has a relatively small thickness cooperates with the internal hollow chamber to provide more effective cushion action. Moreover, the main body A is extremely economical to manufacture since it is made in one process by blow molding.

Figure 7:
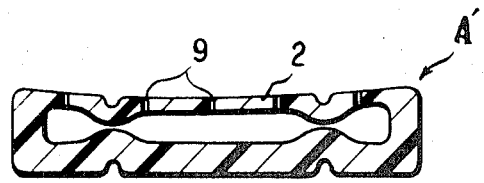
FIG. 7 is a sectional view of the sandal further modified of the sandal as shown in FIG. 1.

If desired, it is possible to form a number of ventilating pores 9 in the upper wall 2 of the main body A′ as shown in FIG. 7. In this case, the repetitive compression and restoring action of the main body effected by the wearer of the footwear causes breathing action through the pores, which makes the footwear sanitary and free for perspiration and odor. It will be easily understood that the main body A′ having ventilating pores is particularly useful when used as a sole of a shoe or boot with an upper for covering the foot, or as an insole provided therein.

Figure 8:
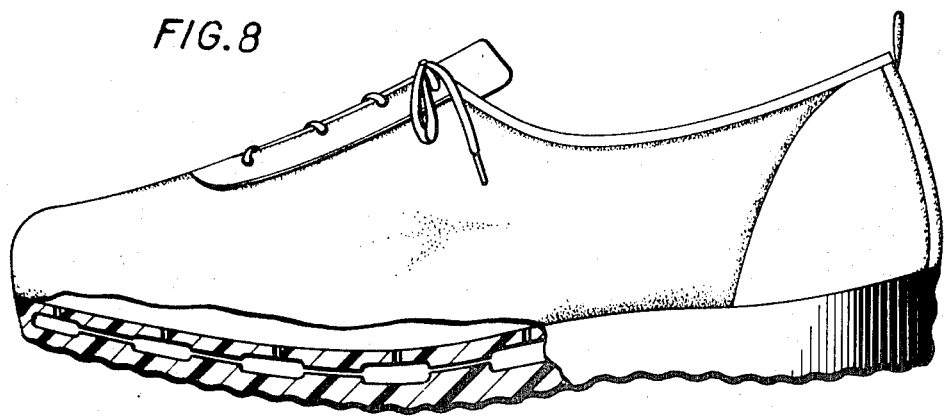
FIG. 8 is a lateral side view, which in part is cut, of a sport shoe according to the present invention.
Figure 9:
FIG. 9 is a sectional view of an insole, available for footwear such as shoe, boot or the like, according to the present invention.
Figure 10:
FIG. 10 is a sectional view of a shorter insole, available for footwear such as shoe, boot or the like, according to the present invention.

FIG. 8 shows an example of ventilating pores formed in a footwear such as an athletic shoe, while FIGS. 9 and 10 show embodiments of a hollow insole for a footwear such as a shoe.

Figure 11:
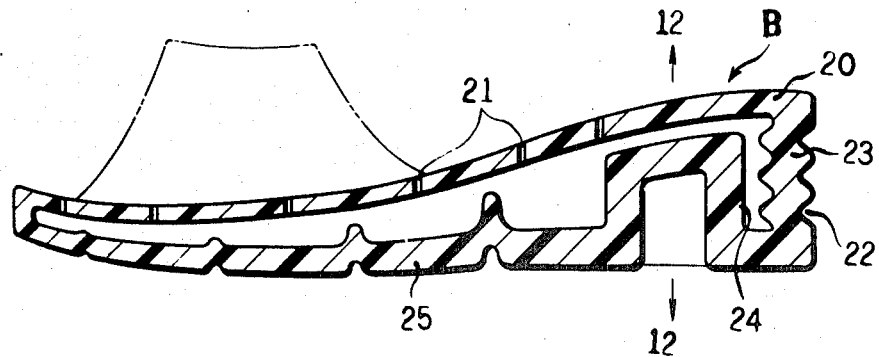
FIG. 11 is a sectional view of other typed sandal according to the present invention.
Figure 12:
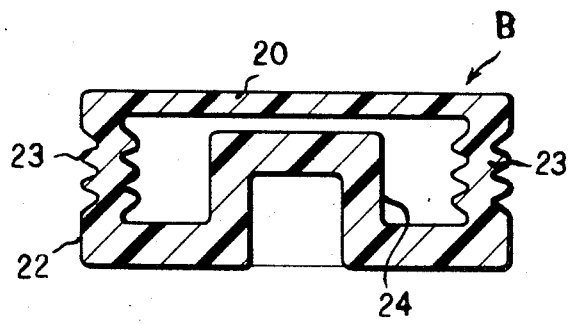
FIG. 12 is a sectional view along line 12—12 of FIG. 11.

FIGS. 11 and 12 show another embodiment of the main body in accordance with the present invention as it is slightly modified as a main body of a sandal of wedge type having a high heel. The main body B has a number of ventilating pores 21 formed in a relatively thin upper wall 20. A vertical peripheral wall 23 in a heel portion 22 is formed in continuous wavelike shape in section like an accordion. This structure insures effective compression and restoration of the heel portion when it is worn, the compressive and restoring actions allowing the ventilating pores 21 to perform effective breathing action. Designated at 24 in FIGS. 11 and 12 is a cylindrical projection at a heel portion extending from a lower wall 25 to the upper wall 20 and serving to reinforce the heel portion. The projection also serves to limit the amount of deformation upon the compression of the heel portion when the wearer walks with the footwear on.

Figure 13:
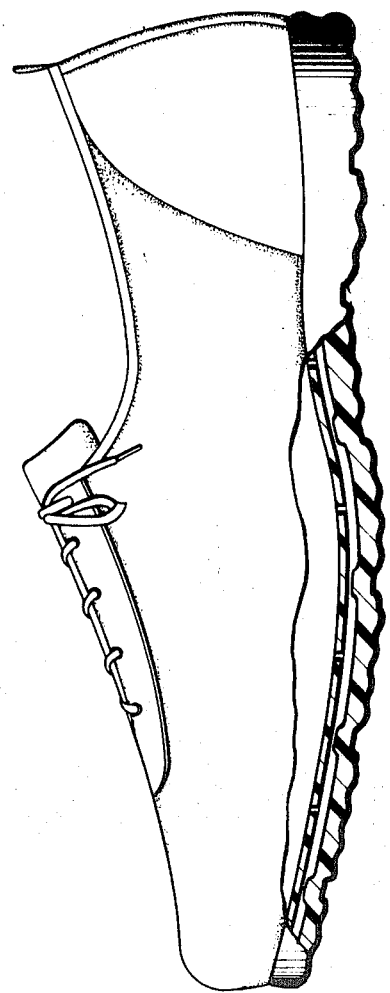
FIG. 13 is a lateral side view, of which in part is cut, of another type of sport shoe according to the present invention.

FIG. 13 illustrates an embodiment in which the structure above is applied to the sole of an athletic shoe.

Figure 14:
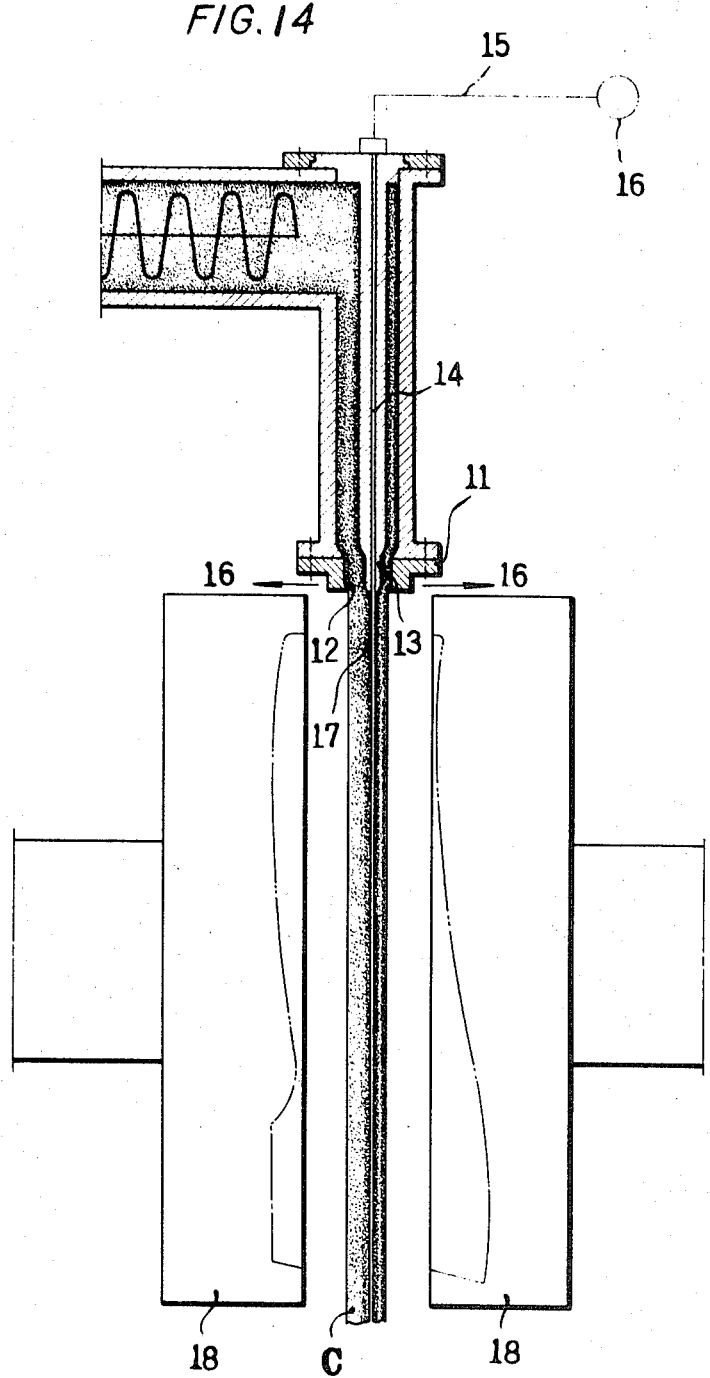
FIG. 14 is a front view of a blow molding apparatus for manufacturing the footwear subject to the present invention.
Figure 15:
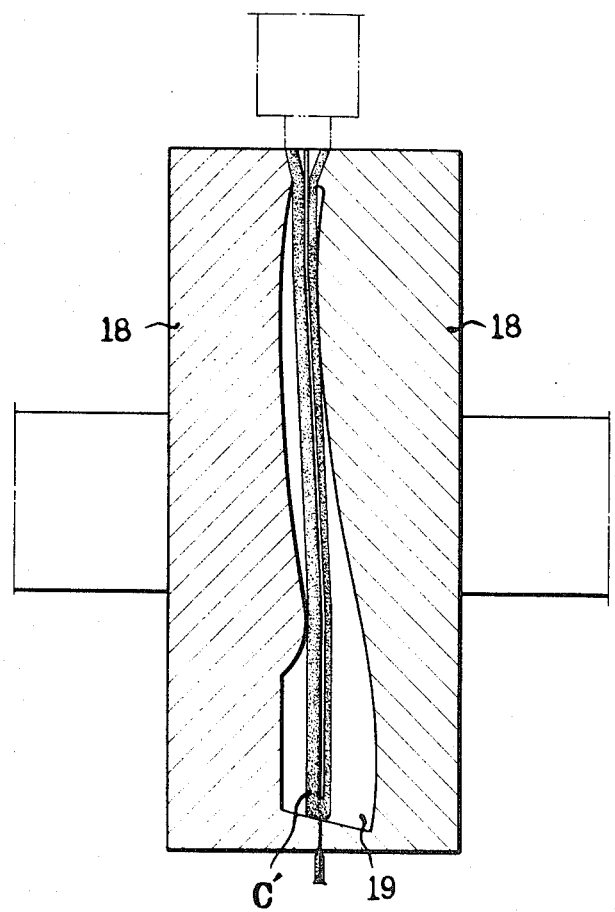
FIG. 15 is a sectional view of a blow molding dies of the apparatus in FIG. 14, wherein an article of footwear is being just manufactured.
Figure 16:
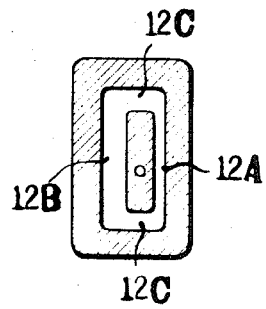
FIG. 16 is a sectional view along line 16—16 of FIG. 14.

FIGS. 14 to 16 are schematic sectional views showing a molding apparatus employed in manufacturing the main body A of the sandal of the present invention. Molds substantially of the same type as those conventionally used in blow molding can be employed. In the drawing, designated at 11 is a die of an extruder. The die 11 is provided at its end with a rectangular discharge outlet 12 which has a core 13 in its center portion so as to form a loop substantially. As shown in FIG. 16 the discharge outlet 12 is so constructed that the width of a portion 12A is small and the widths of the portions 12B and 12C are large. With this structure, a continuous tubular material C having a rectangular shape in transverse section and different in thickness in the peripheral wall portion can be extruded from the discharge outlet. The core 13 has an air pasasge 14 in the center portion along its axis. The upstream end of the air passage 14 is connected to a compressor 16 through a duct 15, while the downstream end of the passage is open at the end of the core 13 to form an air injection nozzle 17. Designated at 18 is a pair of separate molds which are adapted to be moved into or out of snag-fit contact with each other by appropriate drive means (not shown). The separate molds are so constructed that when snugly fitted with each other they form a molding chamber or cavity 19 (FIG. 15) in conformity with the profile of the main body A to be molded.

Figure 17:
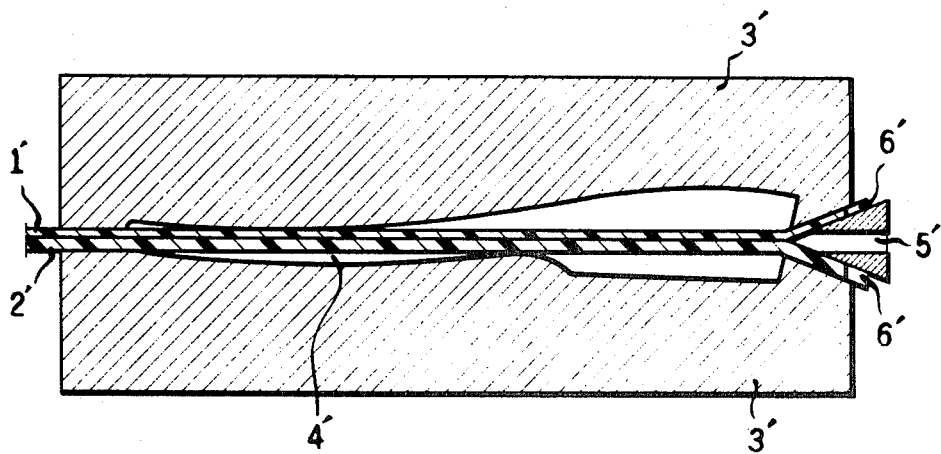
FIG. 17 is a sectional view of other typed blow molding apparatus for manufacturing the footwear of the present invention.

In case of a vinyl chloride resin or a polyolefin resin, a tubular material is extruded from the discharge outlet 12 at a temperature of 160° to 200° C. under appropriate known pressure. The material is then perfectly held between the separate molds 18. Through the ejection nozzle 17 compressed air is thereafter ejected into the hollow portion 20 within the material C′ to be molded in the molding chamber 19, whereby the material C′ is expanded until it is brought into contact with the inner peripheral surface of the molding chamber 19 to obtain the desired main body A. In this operation, the main body A having side walls and lower wall which are thicker than the upper wall can be accurately formed by making the thick wall portion of the tubular material C′ correspond to the under wall and side walls of the main body A. Furthermore, the hollow main body A may be formed by blow molding method using two sheets or films of vinyl chloride resin or polyolefin resin. This case is shown in FIG. 17. Designated at 1′ and 2′ are sheets; at 3′, separate molds; at 4′, a cavity; at 5′, an inlet for forcing in a gas; and at 6′, inlets for sheets.

Further by employing molding methods such as splash molding by which hollow chamber can be formed, the hollow chambers obtained or thereafter modified may all be utilized in forming the main body A.

In some cases, the hollow chamber of the main body A may be formed as a vacuum chamber by conventional means, which serves to prevent the transference of low temperature from the ground or ice surface in cold regions and absorption of the foot temperature by the ground or ice surface. The vacuum hollow chamber is also effective in very hot regions.

Figure 18:
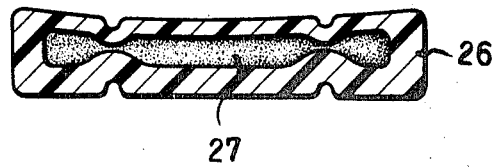
FIG. 18 is a sectional view of the sandal as shown in FIG. 2, provided that a core is formed in the outer layer.

Another modified embodiment of the sandal main body of the present invention is shown in FIG. 18. This embodiment comprises an outer layer 26 corresponding to the main body A shown in FIGS. 1 and 2 and a foamed synthetic resin core 27 provided therein. To place the foamed synthetic resin core 27, a resin material is forced into a hollow chamber 28 of the outer layer 26 by an extruder while the layer is retained in the mold after it has been molded by the foregoing means. The resin material for forming the core 27 is set forth below.

| | Parts |
|---|---|
| Polyester | 100 |
| Mixture of tolylenediisocyanate and activator | 47 |
| N-diethylaminoethanol | 3 |
| Ammonium oleate | 1 |
| Sulfonated castor oil | 1.5 |
| Water | 1.5 |
| Paraffin oil | 0.5 |

The material obtained by stirring and mixing these ingredients is placed into the interior of the outer layer and the molds are retained at an appropriate temperature, for instance, of 10° C. to 20° C. for about 5 minutes until the blowing agent in the material foams. In this case the mold in contact with the heel portion is retained at a low temperature, for instance, at 10° C., while the mold in contact with the toe portion of the main body is retained at a high temperature, for instance, at 20° C., whereby the heeel portion can be made lower in foaming density, namely higher in specific gravity, than the toe portion. Thus, the heel portion to be subjected to marked variations of loading can be made stronger than other portions and due to the provision of the internal foamed resin core 27, the footwear can be made strong as a whole and comfortable to put on with effective cushion action.

Figure 19:
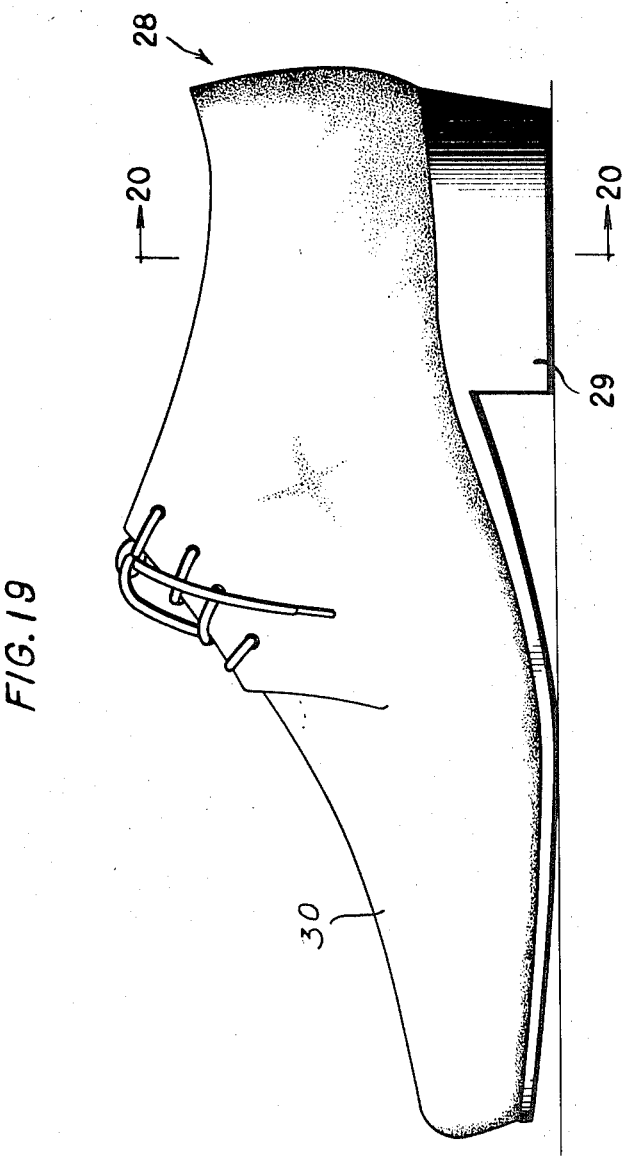
FIG. 19 is a lateral side view of a shoe according to the present invention.
Figure 20:
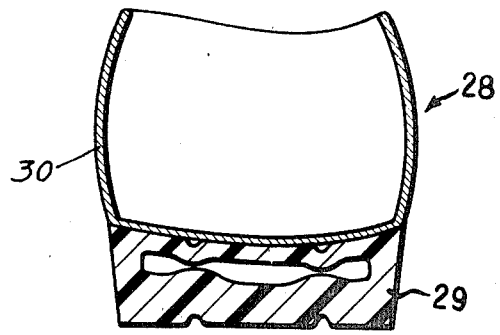
FIG. 20 is a sectional view along line 20—20 of FIG. 19.

Although the present invention has been described in detailed with respect to the embodiments in which it is applied to the main body of sandals, the present invention is not necessarily limited to sandals, but it may also be applied to an insole 29 of a shoe 28 having an upper portion 30 for receiving and securing the foot (FIGS. 19 and 20), or to an inner sole (not shown) to be used in the shoe. These embodiments and various modifications within the scope of the claims set forth below are all included in the present invention.

In forming the articles of the present invention, the material may be molded by injection molding, or by a combination of injection molding and blow molding.

In a further method of manufacturing shoes and other footwears in accordance with the present invention, the sole is formed by an appropriate molding means, for example by the above-described blow molding, while the upper is formed by an appropriate means, for instance by injection molding, the sole and upper thus molded being joined together at the same time as illustrated in FIG. 21. The junction may be effected with an adhesive, by machine stitching or other methods, but most preferably the sole and upper may be joined together before hardening, to facilitate integral junction.

Figure 22:
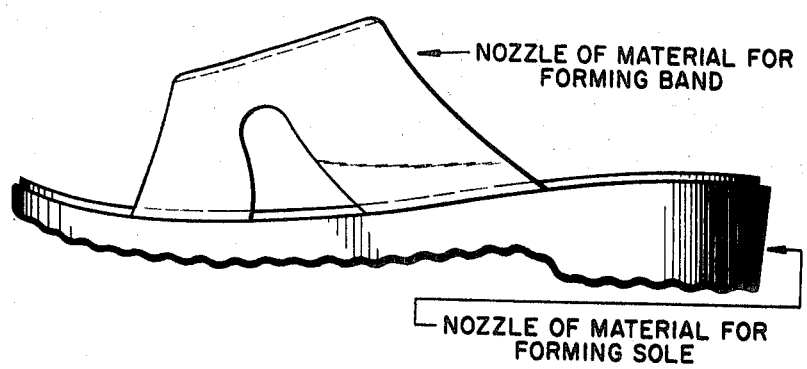
FIG. 22 is a lateral side view of a sandal according to the present invention.

Still another method is shown in FIG. 22 in which the band is molded by an appropriate molding method, for instance by injection molding, while the sole in concurrently molded by an appropriate molding method, for instance, by blow molding, the band and the sole thereafter being joined together by appropriate means as by fusing or by some other method.

What I claim is:

1. An article of footwear having a generally elongated and wedge-shaped main body integrally formed of synthetic thermoplastic resin material having an upper wall, side walls and a lower wall defining a hollow internal chamber, the thickness of the upper wall being less than the thickness of the lower wall, at least one of the walls being provided with at least one ventilating pore therethrough, and a reinforcing projection formed integrally with the upper surface of the lower wall and extending upwardly toward the upper wall and terminating below the upper wall.

2. The structure of claim 1 in which the reinforcing projection extends longitudinally along the upper surface of the lower wall.

3. The structure of claim 1 in which the bottom surface of the lower wall is provided with an upwardly extending recess below the projection.

4. The structure of claim 1 including a reinforcing projection formed integrally with the lower surface of the upper wall and extending downwardly toward the reinforcing projection of the lower wall and terminating above the reinforcing projection of the lower wall.

5. The structure of claim 4 in which the upper surface of the upper wall is provided with a downwardly extending recess above the projection of the upper wall.

6. An article of footwear having an elongated generally wedge-shaped main body integrally formed of synthetic thermoplastic resin material and having an upper wall, sidewalls and a lower wall defining a hollow internal chamber, the thickness of the upper wall being less than the thickness of the lower wall, at least one of the walls being provided with at least one ventilating pore therethrough, and a reinforcing projection formed integrally with the lower surface of the upper wall and extending downwardly toward the lower wall and terminating above the lower wall.

7. The structure of claim 6 in which the reinforcing projection extends longitudinally along the upper wall.

8. The structure of claim 6 in which the upper surface of the upper wall is provided with a downwardly extending recess above the projection.

References Cited

UNITED STATES PATENTS

| | | | |
|---|---|---|---|
| 259,092 | 6/1882 | Butterfield | 36—29 |
| 302,190 | 7/1884 | Butterfield | 36—29 |
| 510,504 | 12/1893 | Foster | 36—29 |
| 622,673 | 4/1899 | Ferrata | 36—35(B)X |
| 2,981,010 | 4/1961 | Aaskov | 36—29X |
| 3,012,342 | 12/1961 | Ramirez | 36—3(B) |

FOREIGN PATENTS

| | | | |
|---|---|---|---|
| 135,593 | 11/1902 | Germany | 36—29 |
| 656,611 | 10/1963 | Italy | 36—29 |

ALFRED R. GUEST, Primary Examiner